Aug. 14, 1934.  C. A. COONEY  1,970,490
FEED MECHANISM FOR RAG CUTTERS
Filed Aug. 22, 1930  2 Sheets-Sheet 2

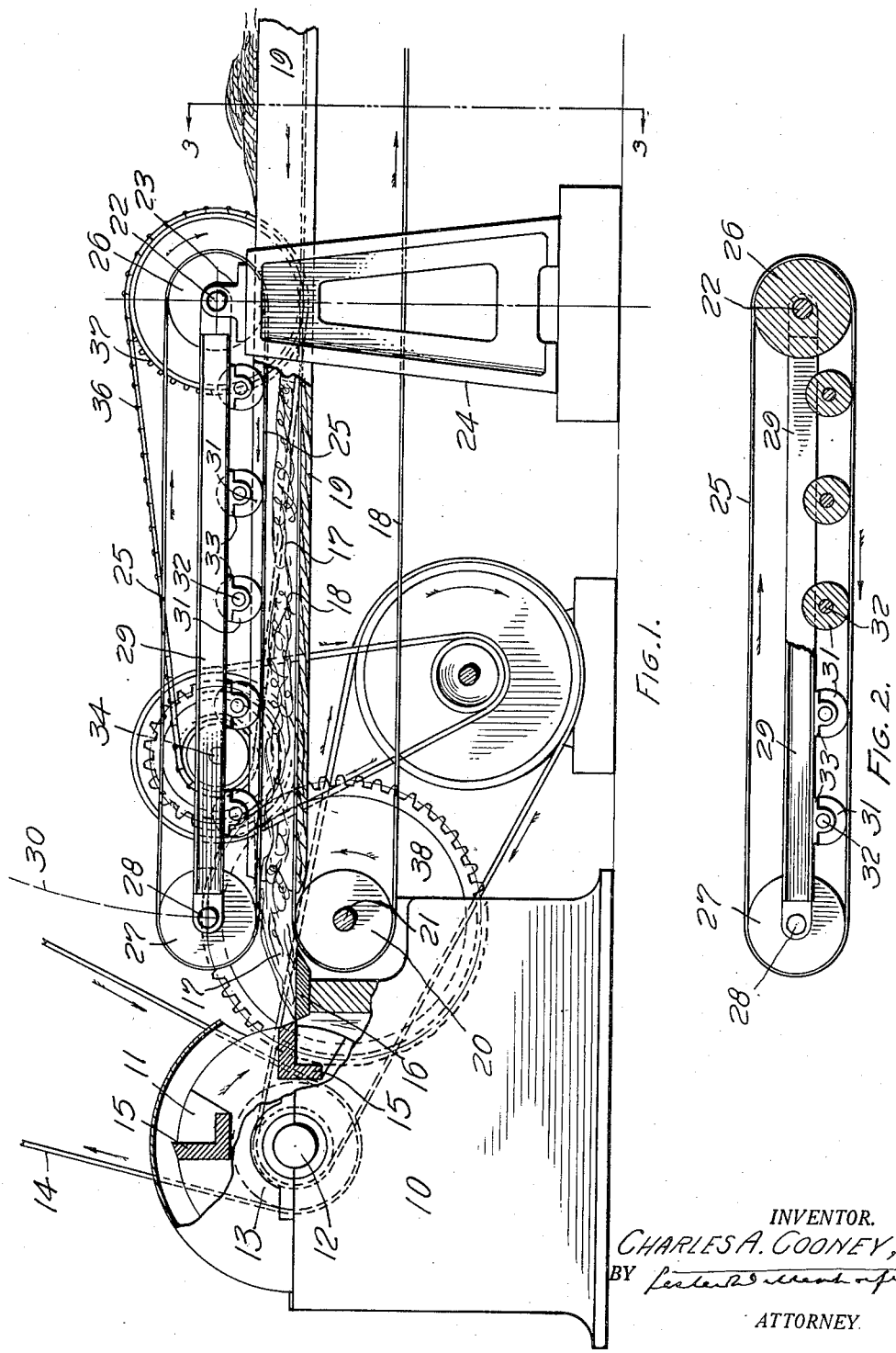

INVENTOR.
CHARLES A. COONEY,
BY
ATTORNEY

Patented Aug. 14, 1934

1,970,490

UNITED STATES PATENT OFFICE 1,970,490

FEED MECHANISM FOR RAG CUTTERS

Charles A. Cooney, Erie, Pa., assignor to The Ruberoid Co., Bound Brook, N. J., a corporation of New Jersey Application August 22, 1930, Serial No. 476,984

2 Claims. (Cl. 198—165)

This invention relates to a feed mechanism for rag cutters of the kind used in paper and felt mills.

In the cutters now in use the rags sometimes clog the machine or wrap themselves around the feed rolls making it necessary to stop the machine in order to free the mechanism from rags. However the operators at times take a chance on clearing the rags without first stopping the machine. This may, and in several occasions has resulted in serious injury to the operator.

The principal object of my invention is to provide a safety feed mechanism of such construction that the rags cannot wrap themselves around the feed rolls.

A further object of my invention is to provide a feed mechanism whereby the rags are fed to the cutters at a uniform, predetermined speed, thereby preventing any clogging of the machine.

Another object is to provide a feed mechanism which is weighted and has a long bearing surface thus giving a firmer hold on the rags and resulting in making the cut rags more uniform and shorter. This reduces the length of time required for the subsequent beating operation required in making the paper stock.

Other objects and advantages of the invention will be apparent to those skilled in the art from the following description thereof, reference being had to the accompanying drawings, in which:

Figure 1 is a side elevation of a rag cutter, partly in section, showing the safety feed in position ready for use;

Fig. 2 is a side view of the rag feeder, partly in section, detached from the machine;

Figure 3:
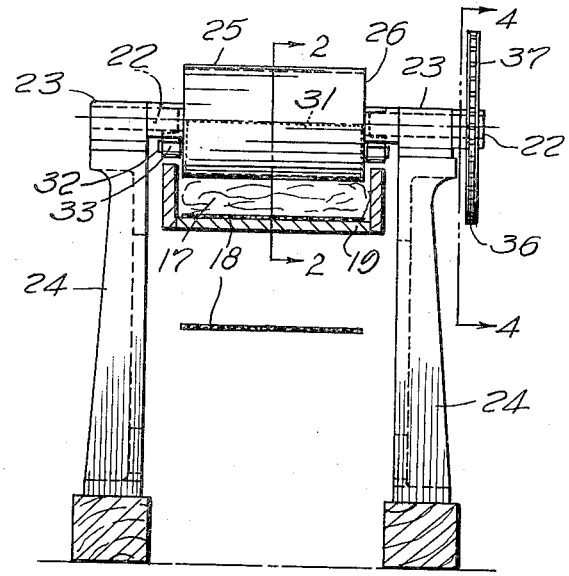
Fig. 3 is an end view of the machine taken in the plane 3—3 indicated in Fig. 1, showing the rag carrier or conveyor in section; and, Fig. 4 is a detail view of the driving mechanism of the feeder, in which the feeder and the rag carrier are indicated by dash lines.
Figure 4:
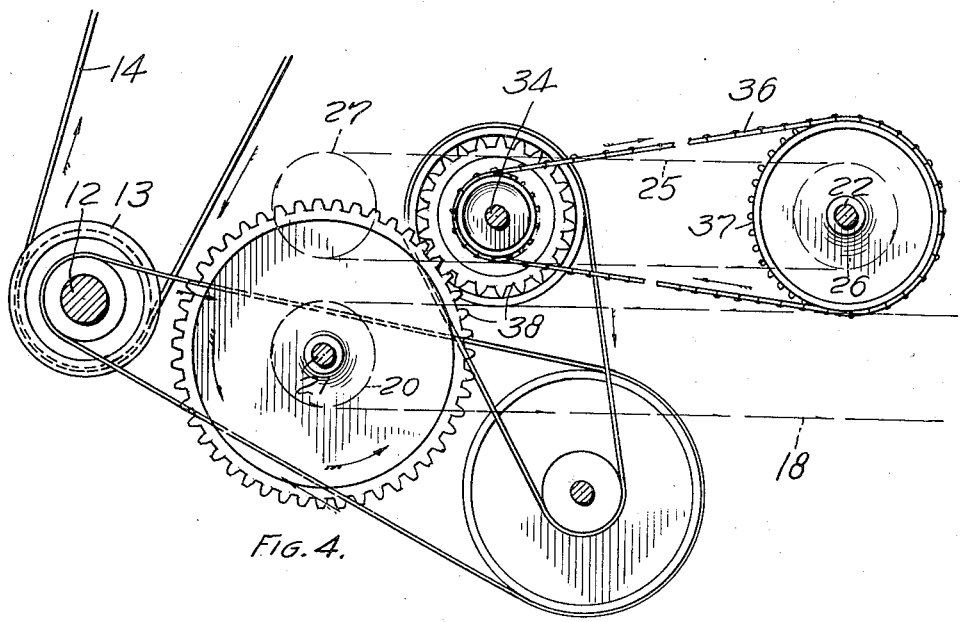

The rag cutter 10 is of the conventional type having a rotary cutter head 11 mounted on a shaft 12. Said shaft carries a pulley 13 which is driven by a belt 14 from a source of power not shown. The cutter head is provided with a series of knives 15 which cooperate with a fixed knife 16 to shear or cut the rags into small pieces or shreds, the knife 16 being mounted on the frame of the machine.

The rag carrier or conveyor comprises an endless belt 18 the upper span or reach of which travels through a guide box or trough 19, said belt being continuously driven by a pulley 20 mounted on a shaft 21 journaled in the frame of the machine. The parts thus far described are all old in the art, being parts of a conventional cutting machine, and are referred to merely in their relation to the safety feed, which I shall now proceed to describe.

The safety feed mechanism, to which this invention particularly relates, is mounted on the shaft 22 carried by the pillow blocks 23 supported on the standards 24 in such position that the lower span or reach of the endless feed belt 25 is below the edges of the guide box 19. The belt 25 is driven by the pulley 26 mounted on said shaft 22. The opposite end of said belt is carried by a pulley 27 mounted on the shaft 28. This shaft is carried by a bearing fixed at the end of the structural frame 29 which frame is hinged on the shaft 22 permitting the feeder mechanism as a whole to swing upward, the center of the shaft 28 moving along a path indicated by the dotted line 30 in Fig. 1. This hinge mounting permits the weight of the feeder to press down upon the rags 17 carried on the conveyor 18, thus preventing the rags from being drawn whole through the cutter when the cutter knives are dull or out of adjustment. A series of idle rolls 31 are carried on pins 32 mounted on bearings 33 set at intervals along the frame 29. These idle rolls form a backing for the belt 25 so that the rags are held firmly the entire length of the feeder.

The power to drive the feeder is taken from the cutter shaft 12 and transmitted through any convenient speed reduction mechanism to the shaft 34. A sprocket 35 is mounted on said shaft and through the chain 36 drives the sprocket 37 keyed to the shaft 22, thus driving the feeder belt 25. The conveyor belt 18 is driven by the gearing 38 to turn in the opposite direction to the feeder felt 25 so that the upper reach of the conveyor and the lower reach of the feeder belt will both travel towards the cutter, and at a substantially uniform rate of speed.

Various modifications in the construction and arrangement of parts herein illustrated and described may be made within the scope of the invention.

What I claim is:—

1. A conveyor for use with a rag cutter having a guide trough, comprising a feed belt having its upper flight traveling through the trough, a second and upper feed belt cooperating with the first feed belt and having its lower flight traveling within the trough and disposed substantially parallel to the upper flight of the first belt, a frame carrying said second belt and disposed between the upper and lower flights of the second feed belt and extending throughout the major portion of the length of the second belt, means to mount the frame for swinging movement at the rear end thereof, idler rolls arranged at intervals throughout the length of the frame, said idler rolls having their axes disposed transversely to and below the longitudinal axis of said frame, whereby said idler rolls bear on the upper face of the lower flight of the second belt to distribute the weight of the frame evenly over the lower flight of said second belt, and power means for actuating said belts in unison.

2. In a safety feed mechanism for rag cutters, the combination with a guide trough and a belt conveyor for conveying rags through the trough, of a driving shaft extending transversely above the trough at a substantial distance back from the discharge end of the conveyor, a pulley fixed to said shaft, a rigid frame pivoted at one end on said shaft and extending longitudinally above the trough and over the discharge end of the conveyor, an idler pulley mounted on the free end of the frame, an endless belt carried on said pulleys with its lower flight traveling within the trough in unison with and in the direction of movement of the conveyor, and a series of idler rolls mounted on the frame at intervals throughout the length thereof and forming a backing for the lower reach of said belt, whereby the weight of the frame and the rollers cause the belt to bear down on the rags carried on the conveyor so as to firmly hold the rags throughout the length of said belt.

CHARLES A. COONEY.